(No Model.)
I. NAPPIN.
NUT LOCK.
No. 504,608. Patented Sept. 5, 1893.
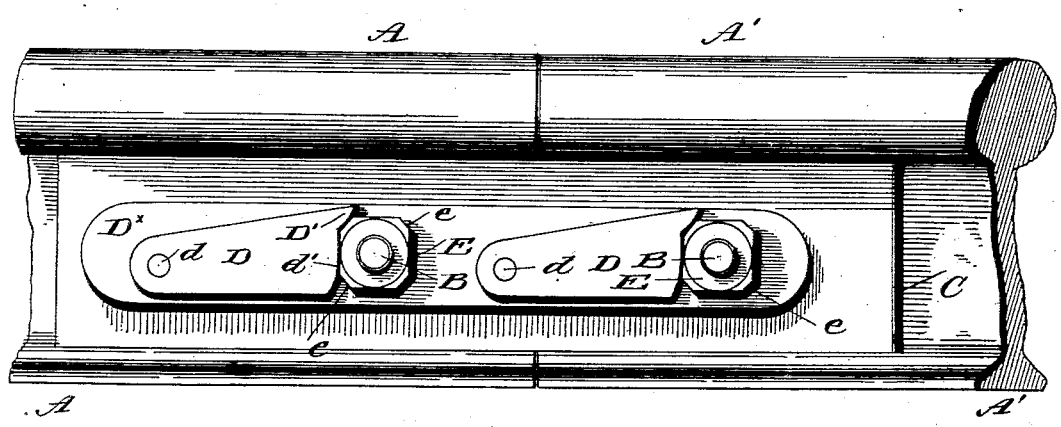
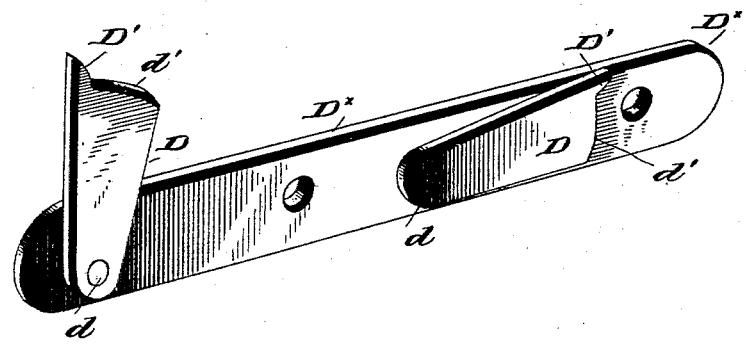
Witnesses:
L. C. Hills
E. S. Trull
Inventor
Ira Nappin,
by Franklin H. Hough
Attorney

UNITED STATES PATENT OFFICE.

IRA NAPPIN, OF FARMINGTON, ILLINOIS.

NUT-LOCK.

SPECIFICATION forming part of Letters Patent No. 504,608, dated September 5, 1893.

Application filed June 7, 1893. Serial No. 476,866. (No model.)

*To all whom it may concern:*

Be it known that I, IRA NAPPIN, a citizen of the United States, residing at Farmington, in the county of Fulton and State of Illinois, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in nut locks of that class in which is employed a pivoted or movable part having one end adapted to engage the side of the nut to prevent its turning backward, and it has for its objects among others to provide an improved nut lock of this class which shall be simple, cheap, easily applied, durable and efficient.

I form the pivoted or movable part with a cam portion which engages the side of the nut and which serves to more effectually prevent retrograde movement of the nut. I also form the locking plate or part with a lip or tongue by which it may be disengaged from the nut and which engages over the corner of the nut which is cut away for this purpose. By the employment of my form of locking plate with its cam portion and tongue or lip the nuts can be quickly and easily secured in place much easier than where the free end of the plate is formed to embrace or receive the nut and can be much more easily and quickly removed when desired. The cost of manufacture is less.

Other objects and advantages of the invention will hereinafter appear and the novel features thereof will be specifically defined by the appended claim.

The invention in this instance resides in the peculiar combinations, and the construction, arrangement and adaptation of parts, all as more fully hereinafter described, shown in the drawings, and then particularly pointed out in the claim.

The invention is clearly illustrated in the accompanying drawings, which, with the letters of reference marked thereon, form a part of this specification, and in which—

Figure 1 is a side elevation of a section of a railway rail showing the application of my invention. Fig. 2 is a perspective view of the locking plate detached and on an enlarged scale.

Like letters of reference indicate like parts in both of the views.

Referring now to the details of the drawings by letter, A designates a portion of a railroad rail of known construction, and A' a portion of the adjacent rail, the two ends being designed to be secured together by the bolts B which pass therethrough. I have chosen to show my improvement in connection with railroad rails as it is in such connection the invention is designed primarily to serve, but I wish it understood that I do not intend to limit myself to its use in connection with railroad rails as the invention is applicable to all uses where nut locks are desirable.

A fish plate C may be employed or not as may be preferred. I have shown one in this instance, it having holes for the passage of the bolts B and the locking plates are shown as pivotally mounted on the fish plate or a plate $D^\times$, but where no fish plate is employed the locking plates may be pivotally mounted upon the rails. The use of fish plates however is advisable.

D is my improved locking plate; it is of any suitable metal and is pivoted at one end as shown at $d$ to the fish plate or the plate $D^\times$ when a fish plate is not employed while it is gradually widened toward its other end which is formed with a cam portion $d'$ which is adapted to engage the side of the nut as seen in Fig. 1. The upper face of the free end of the locking plate is formed with a projection, tongue or lip D' as shown best in Fig. 2 which serves as a means whereby the locking plate can be turned up from its engagement with the side of the nut.

The nut E is fitted to the bolt and has its corners cut away as shown at $e$ to be engaged by the projection, lip or tongue of the locking plate as shown whereby the nut is more effectually prevented from turning backward.

By reason of the cam face or portion of the locking plate any tendency of the nut to turn backward is met by the said cam portion which, together with the projecting lip or tongue, serves to more effectually hold the nut against turning. Sufficient pressure brought to bear in the proper direction will disengage the locking plate from the nut and allow the latter to be turned.

It will be observed that my locking plate is constructed for use with octagonal nuts only, but being used therewith the free end of the said plate has a bearing at one side of the nut and also at the corner, the lip or tongue D' being also cam shaped as shown, and the nut is thus more securely held against displacement.

What I claim as new is—

The combination with the rails and the bolts, of the nuts with cut-away corners, and the pivoted locking plate having a cam portion and a projection, having a cam face substantially as and for the purpose specified.

In testimony whereof I affix my signature in presence of two witnesses.

IRA NAPPIN.

Witnesses:
GEORGE ROBINSON,
J. B. DILLE.